(12) United States Patent
Denny et al.

(10) Patent No.: US 7,778,229 B2
(45) Date of Patent: Aug. 17, 2010

(54) OPTIMIZED IP ADDRESS USE IN A MOBILE IP ENVIRONMENT

(75) Inventors: Mark Denny, San Jose, CA (US); Yu-Cheng Shao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 11/193,097

(22) Filed: Jul. 29, 2005

(65) Prior Publication Data
US 2007/0025305 A1 Feb. 1, 2007

(51) Int. Cl.
*H04Q 7/24* (2006.01)
(52) U.S. Cl. .................. 370/338; 370/400; 455/432.1; 455/433
(58) Field of Classification Search .......... 370/338, 370/400, 330, 331, 332, 349; 455/432.1, 455/433, 435.1, 423, 436–439
See application file for complete search history.

(56) References Cited

U.S. PATENT DOCUMENTS

| | | | |
|---|---|---|---|
| 6,501,746 B1 | 12/2002 | Leung | |
| 6,751,459 B1 * | 6/2004 | Lee et al. | 455/445 |
| 6,999,436 B2 * | 2/2006 | Zheng et al. | 370/331 |
| 7,193,977 B2 * | 3/2007 | Lim | 370/313 |
| 7,218,609 B2 * | 5/2007 | Borella et al. | 370/230 |
| 7,286,520 B2 * | 10/2007 | Takeda et al. | 370/349 |
| 7,385,957 B2 * | 6/2008 | O'Neill | 370/338 |
| 7,406,064 B2 * | 7/2008 | Morishige et al. | 370/331 |
| 2003/0208568 A1 * | 11/2003 | Inoue et al. | 709/220 |
| 2004/0013099 A1 * | 1/2004 | O'Neill | 370/338 |
| 2004/0029584 A1 * | 2/2004 | Le et al. | 455/432.1 |
| 2004/0203765 A1 * | 10/2004 | Das et al. | 455/435.1 |
| 2005/0094606 A1 * | 5/2005 | Adrangi et al. | 370/338 |
| 2005/0195773 A1 * | 9/2005 | Popovich et al. | 370/338 |
| 2006/0133316 A1 * | 6/2006 | Jagana et al. | 370/331 |
| 2006/0215595 A1 * | 9/2006 | Hancock et al. | 370/328 |
| 2007/0036115 A1 * | 2/2007 | Ono et al. | 370/338 |

OTHER PUBLICATIONS

Finseth, "An Access Control Protocol, Sometimes Called TACACS". RFC 1492. Jul. 1993.
Droms, "Dynamic Host Configuration Protocol". RFC 2131. Mar. 1997.
Rigney, "Remote Authentication Dial In User Service (RADIUS)". RFC 2138. Apr. 1997.
Dommety, "Mobile IP Vendor/Organization-Specific Extensions". RFC 3115. Apr. 2001.
Perkins, "IP Mobility Support for IPv4". RFC 3344. Aug. 2002.

* cited by examiner

*Primary Examiner*—CongVan Tran
(74) *Attorney, Agent, or Firm*—Weaver Austin Villeneuve & Sampson LLP (57) ABSTRACT

Methods and apparatus for initiating the release of an IP address allocated for use by a Mobile Node supporting Mobile IP are disclosed. The IP address may be a collocated care-of address or a dynamically assigned home address. The release of the IP address may be initiated by the Home Agent based upon information it has received in a registration request or, alternatively, may be initiated by the Home Agent in response to a de-registration request. In this manner, a Home Agent may initiate the release of an IP address that is no longer in use by a Mobile Node.

27 Claims, 7 Drawing Sheets

| Home address 404 | Care-of address (Local IP address) 406 | Lease time 408 | MAC address 410 | DHCP server address 412 |
|---|---|---|---|---|
| | | | | |
| | | | | |

Mobility Binding Table 402
FIG. 4

OPTIMIZED IP ADDRESS USE IN A MOBILE IP ENVIRONMENT

BACKGROUND OF THE INVENTION

The present invention relates to Mobile IP network technology. More specifically, this invention relates to mechanisms for optimizing IP address use in a Mobile IP environment.

Mobile IP is a protocol which allows laptop computers or other mobile computer units (referred to as "Mobile Nodes" herein) to roam between sub-networks and types of network adapters—while maintaining IP connectivity. Without Mobile IP or a related protocol, a Mobile Node would be unable to maintain IP sessions while roaming through various sub-networks. This is because the IP address required for any node to maintain IP sessions is location specific. Each IP address has a field that specifies the particular sub-network on which the node resides. If a user desires to take a computer that is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet back to their home network. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

Figure 1:
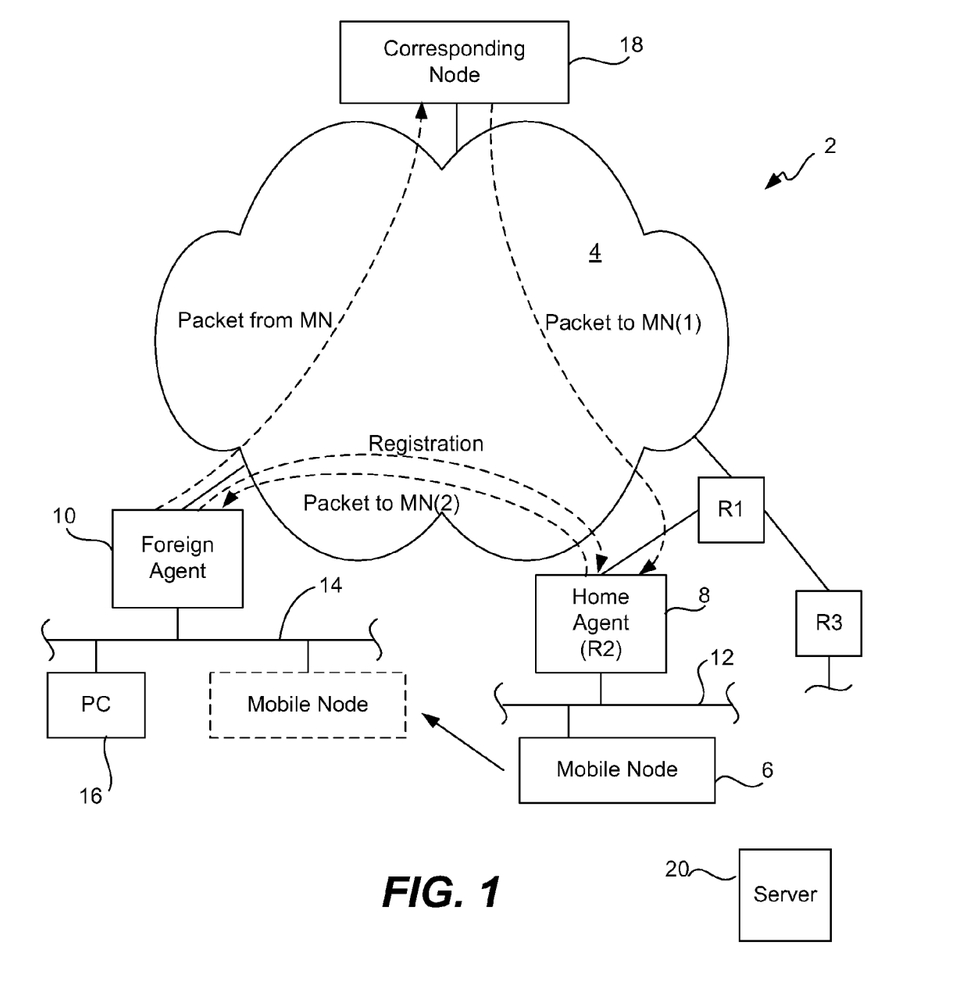
FIG. 1 is a diagram of a Mobile IP network segment and associated environment.

The Mobile IP process in a Mobile IPv4 environment is illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

In the absence of a Foreign Agent, when a Mobile Node roams to a new location, it is assigned a collocated care-of address. The collocated care-of address is an IP address that is local to the network and subnet in which the Mobile Node has roamed. This IP address is generally allocated by a server 20 such as a DHCP server from a pool of available IP addresses. Since network users are highly mobile, the networks and subnets to which they are connected change frequently. When an IP address is allocated to a user, the IP address is typically allocated for a period of time. The period of time for which the IP address is allocated is typically referred to as a "lease time." The DHCP server is typically configured to allocate an IP address for a particular period of time. For example, the lease time could be a week. Of course, in a highly mobile environment, a user might connect to a particular network for only a few hours or minutes before moving to a new network. Unfortunately, the IP address that has been allocated and assigned to that user is not re-usable within the network until the lease time expires, at which time the address is returned to the pool of available IP addresses.

In addition, IP addresses may also be allocated as home addresses. For instance, a home address may be allocated by a Home Agent to a Mobile Node. One system for dynamically allocating home addresses to Mobile Nodes is described in Attorney Docket No. CISCP078, U.S. Pat. No. 6,501,746, entitled "Mobile IP Dynamic Home Address Resolution," by Kent Leung, filed on Jan. 8, 1999 and issued on Dec. 31, 2002, which is incorporated herein for all purposes. While IP addresses are allocated as home addresses, there fails to be a mechanism for releasing those IP addresses when no longer in use.

In view of the above, it would be beneficial if IP address use could be optimized in a Mobile IP environment.

SUMMARY OF THE INVENTION

Methods and apparatus for initiating the release of an IP address allocated for use by a Mobile Node supporting Mobile IP are disclosed. The release of the IP address may be initiated by the Home Agent based upon information it has received in a registration request or, alternatively, may be initiated by the Home Agent in response to a de-registration request. In this manner, a Home Agent may initiate the release of an IP address that is no longer in use by a Mobile Node.

In accordance with another aspect of the invention, the release of an IP address no longer used by a Mobile Node may be initiated by a Home Agent. When the IP address is assigned by another server, the Home Agent initiates the release of the IP address by sending a release message to the allocating server. For instance, when the server is a DHCP server, the release message may be a DHCPRELEASE message.

In accordance with one embodiment, information enabling a Home Agent to release an IP address may be provided to the Home Agent in a registration request. For instance, when a Mobile Node obtains a collocated care-of address, the Mobile Node may transmit information such as the care-of address, lifetime of the care-of address, IP address of the server allocating the care-of address, and/or hardware address of the Mobile Node in the registration request.

In accordance with one aspect of the invention, the IP address may be a collocated care-of address or a dynamically assigned home address. The release of the IP address may be initiated by the Home Agent in response to a de-registration request or information obtained from a registration request. More particularly, the receipt of a de-registration request may indicate to the Home Agent that the Mobile Node is no longer using a collocated care-of address and/or dynamically assigned home address. The Home Agent may also examine information in a registration request to determine whether an IP address (e.g., collocated care-of address) is still in use. For instance, the Home Agent may determine whether the care-of address in a registration request differs from the care-of address associated with a particular Mobile Node in the Home Agent's mobility binding table.

In accordance with another aspect of the invention, the invention pertains to a system operable to perform and/or initiate the release of particular home address that has been allocated to the Mobile Node and/or a collocated care-of address. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of the invention enable IP address use to be optimized in a Mobile IP environment. Typically, an IP address that is allocated to a Mobile Node as a collocated care-of address (or home address) is generally released when the lease time associated with the IP address has expired. In accordance with various embodiments of the invention, when a collocated care-of address (or home address) is no longer in use by a Mobile Node, it is released for use by other entities. More particularly, the release of the IP address(es) is initiated by the Mobile Node's Home Agent, as will be described in further detail below.

Generally, when an IP address is allocated by a DHCP server, the IP address will not be released until the expiration of the associated lease time. The DHCP server is also typically configured with two different timers, which will enable the DHCP server to release the IP address at 50 percent of the lease time and at 80 percent of the lease time, respectively. More particularly, the DHCP server sends a message to the device to which the IP address has previously been allocated. If a response is not received, the IP address will be released by the DHCP server. Unfortunately, since the DHCP server receives no information regarding the continued or discontinued use of allocated IP addresses, the DHCP server must periodically request this information to determine if the IP addresses are still in use.

Figure 2:
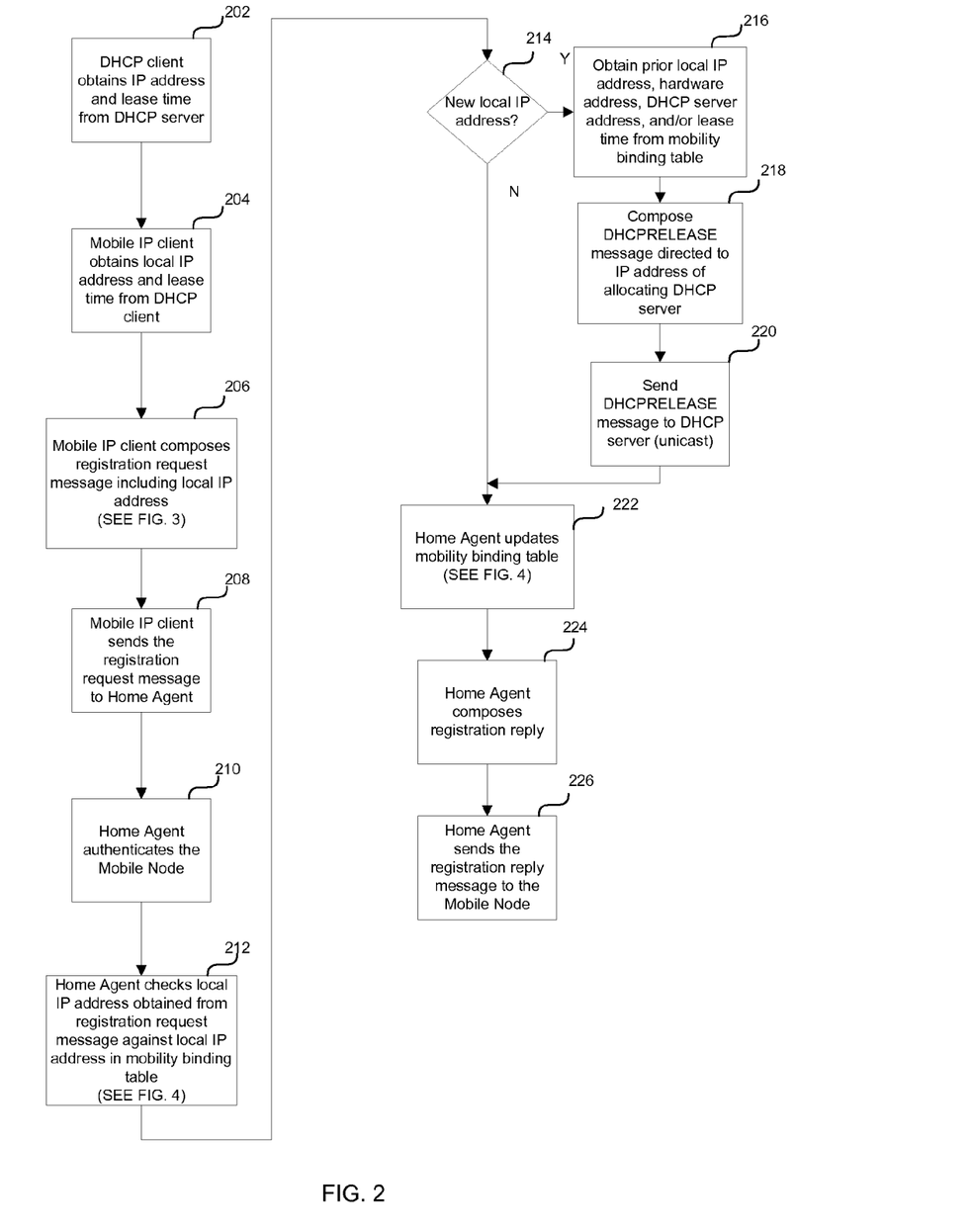
FIG. 2 is a process flow diagram illustrating a method of performing registration in accordance with one embodiment of the invention.

FIG. 2 is a process flow diagram illustrating a method of performing registration in accordance with one embodiment of the invention. In the absence of a Foreign Agent, the Mobile Node obtains a collocated care-of address. This may be accomplished via a server such as a DHCP server or PPP server. In order to understand the functionality of the Mobile Node, the Mobile Node may be logically divided into a Mobile IP client including Mobile IP hardware and/or software adapted for performing Mobile IP functionality such as registration processes and a DHCP client (or PPP client), for example. The Mobile Node (e.g., DHCP client) obtains a collocated care-of address (e.g., local IP address) from a server (e.g., DHCP server) and its associated lease time at 202. The Mobile IP client may then obtain the local IP address and associated lease time from the DHCP client at 204. For instance, the Mobile IP client may use an Application Programming Interface (API) to request or obtain this information from the DHCP client. This information may be used by the Mobile Node to enable the Mobile Node to extend its lease time should it expire before it has completed its Mobile IP session. Other information that may also be obtained include the IP address of the allocating server (e.g., DHCP server).

As set forth above with reference to U.S. Pat. No. 6,501,746, a Home Agent may dynamically assign a home address. The home address may be assigned by the Home Agent via a server such as an AAA server that can provide authorization and accounting services, as well as authentication services. While authentication determines who an entity is, authorization determines what services a user is allowed to perform, or access. Various protocols such as the Remote Authentication Dial In User Service (RADIUS) and TACACS+ may be implemented to provide such a server. In addition, this protocol may similarly be implemented on each Home Agent that communicates with the server. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

In order to enable a home address to be released by the Home Agent, the Home Agent may store the IP address of the allocating server, as appropriate. In addition, the Home Agent may also store the lease time of the home address. This information may be stored in a table such as a mobility binding table, or other suitable data structure, as will be described in further detail below.

Once the Mobile IP client has the collocated care-of address and/or dynamically assigned home address, it composes a registration request including the home address and care-of address at 206. An exemplary registration request will be described in further detail below with reference to FIG. 3. The Mobile IP client sends the registration request to the Home Agent at 208, which authenticates the Mobile Node at 210. In order to ensure that collocated care-of addresses are released when no longer in use by Mobile Nodes, the Home Agent checks the collocated care-of address from the registration request against information in its mobility binding table at 212. For instance, the Home Agent may ascertain whether an entry exists in the mobility binding table for the Mobile Node (e.g., home address). If an entry exists, the Home Agent determines whether the collocated care-of address is the same as that in its mobility binding table entry for the Mobile Node. An exemplary mobility binding table entry will be described in further detail below with reference to FIG. 4.

If the Home Agent determines that the collocated care-of address is different from that in the mobility binding table entry for the Mobile Node at 214, the Mobile Node has roamed from its prior location and therefore is no longer using the collocated care-of address that was local to the previously visited subnetwork. The Home Agent can now initiate the release of the prior collocated care-of address as identified in the mobility binding table entry. This may be accomplished by obtaining information from the mobility binding table entry at 216 such as the collocated care-of address, the IP address of the server that allocated the care-of address to the Mobile Node, an identifier of the Mobile Node such as a hardware address (e.g., MAC address), and/or a lease time associated with the allocated care-of address. The Home Agent can then initiate the release of the previously allocated care-of address. Specifically, the Home Agent instructs the server that allocated the care-of address to release the care-of address for use by other entities (e.g., Mobile Nodes). The Home Agent constructs a release message that identifies the care-of address directed to the IP address of the server and sends the release message to the server. In this example, the Home Agent composes a DHCPRELEASE message directed to the IP address of the allocating DHCP server at 218 in accordance with RFC 2131, entitled "Dynamic Host Configuration Protocol," by R. Droms, published March 1997, which is incorporated herein by reference for all purposes. The Home Agent then sends the unicast DHCPRELEASE message to the DHCP server at 220.

In addition to initiating the release of the collocated care-of address that is no longer in use after the Mobile Node roams from its prior location, the Home Agent also updates its mobility binding table at 222. An exemplary mobility binding table is described in further detail below with reference to FIG. 4. In order to update its mobility binding table, the Home Agent may delete or modify the existing entry for the Mobile Node such that the Mobile Node is associated with the new collocated care-of address (and no longer associated with the old collocated care-of address). In addition, the Home Agent may also store the IP lo address of the allocating server. A tunnel is created between the IP address of the Home Agent and the care-of address according to standard processes, and the Home Agent composes a registration reply indicating whether registration of the Mobile Node is successful at 224 and sends the registration reply to the Mobile Node at 226.

Figure 3:
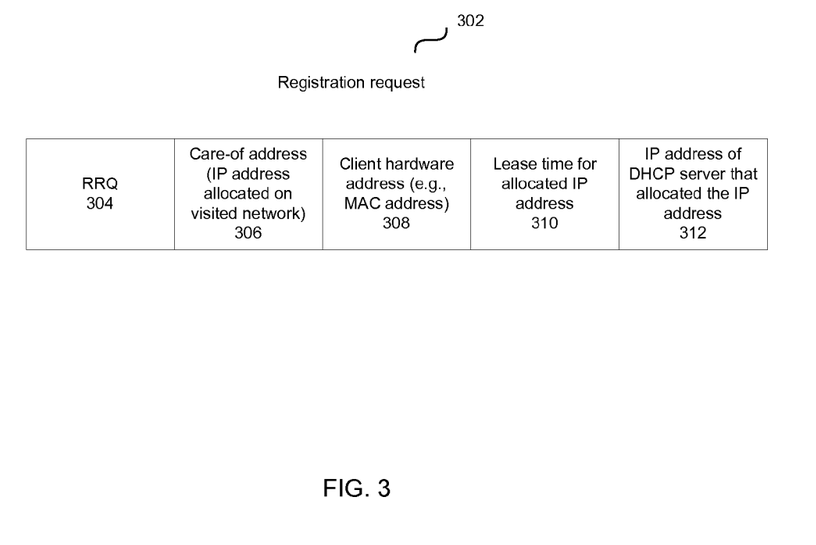
FIG. 3 is a diagram illustrating an exemplary registration request that may be transmitted in accordance with one embodiment of the invention.

FIG. 3 is a diagram illustrating an exemplary registration request 302 that may be transmitted in accordance with one embodiment of the invention. A standard registration request 304 typically includes fields such as a home address field (not shown) and a care-of address field 306. As described above, the care-of address field 306 may carry the collocated care-of address that has been assigned to the Mobile Node. Generally, the registration request 304 need not include the Mobile Node's hardware address (e.g., MAC address). However, in accordance with one embodiment, in order to enable a release message to be transmitted to the allocating server, the Mobile Node's hardware address 308 may be transmitted in the registration request 304. In addition, the lease time 310 for the allocated care-of address may also be provided in the registration request 304. In order to identify the server that has allocated the IP address, a server address 312 identifying the server (e.g., DHCP server) that allocated the care-of address may also be provided in the registration request 304. For instance, the hardware address 308, lease time 310, and/or server address 312 may be provided in extensions to the registration request 304.

Figure 4:
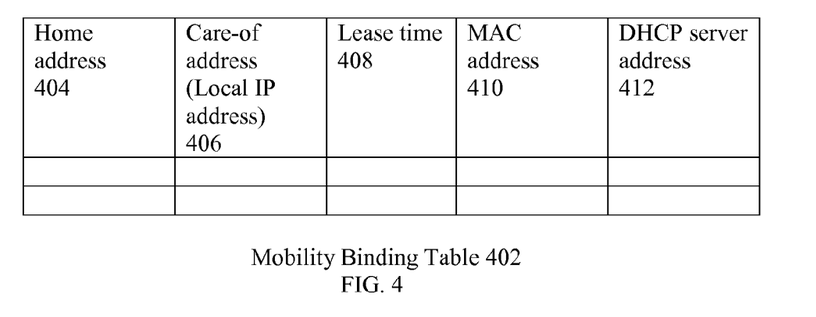
FIG. 4 is a diagram illustrating an exemplary mobility binding table maintained by a Home Agent in accordance with one embodiment of the invention.

FIG. 4 is a diagram illustrating an exemplary mobility binding table maintained by a Home Agent in accordance with one embodiment of the invention. Generally, a mobility binding table 402 includes the home address 404 of a Mobile Node and its care-of address 406. In accordance with various embodiments, additional information enabling the care-of address 406 (and/or home address 404) to be released is also stored in the mobility binding table until it is no longer needed. For instance, the lease time 408, hardware address 410, and/or server address 412 may also be stored in the mobility binding table 402.

In the described embodiments, the Home Agent compares information in a registration request against information in its mobility binding table in order to determine whether an IP address allocated as a collocated care-of address is still in use. For instance, as described above, the care-of address in a registration request is compared against the care-of address in the Home Agent's mobility binding table for the Mobile Node.

Figure 5:
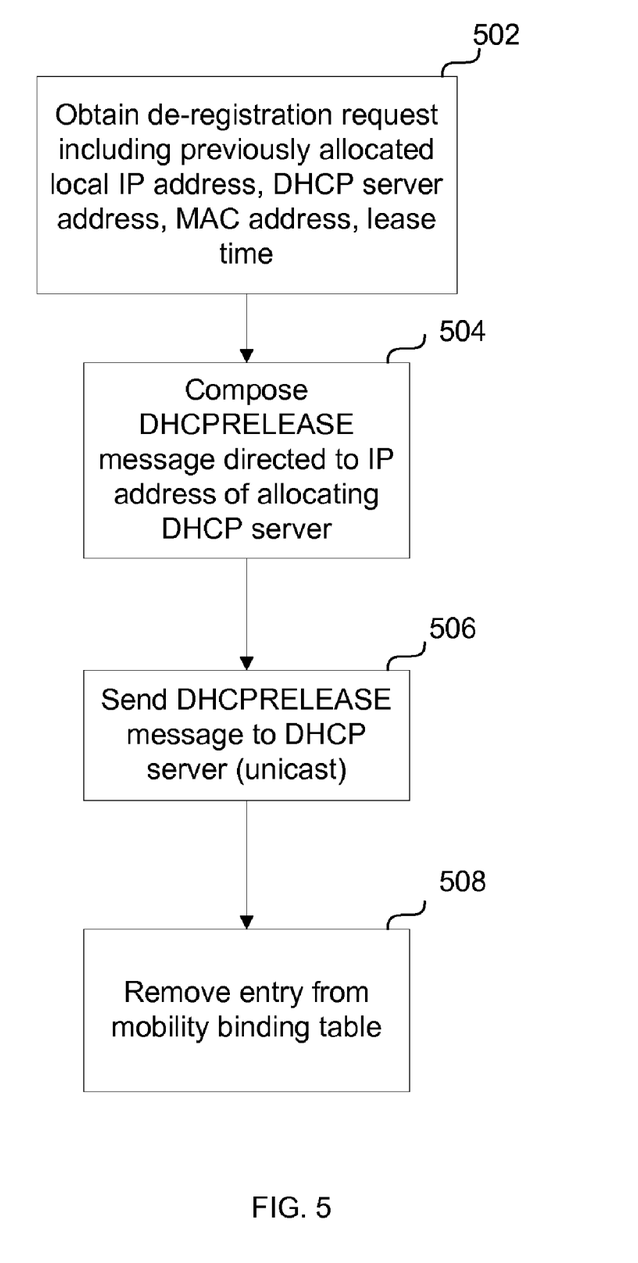
FIG. 5 is a process flow diagram illustrating a method of performing de-registration by a Home Agent in accordance with one embodiment of the invention.

In alternative embodiments, a home address is dynamically allocated to a Mobile Node through a mechanism such as that disclosed in U.S. Pat. No. 6,501,746. A Mobile Node may send a de-registration request to the Home Agent to initiate the release of the home address and/or collocated care-of address. FIG. 5 is a process flow diagram illustrating a method of performing de-registration by a Home Agent in accordance with one embodiment of the invention. The Home Agent receives a de-registration request at 502. An exemplary de-registration request will be described in further detail below with reference to FIG. 6. The de-registration request includes the home address and care-of address, and may also include the IP address of the allocating server, the lease time and/or the hardware address of the Mobile Node.

When the Home Agent receives the de-registration request, it composes and sends a release message to the appropriate server at 504 and 506, respectively. In accordance with one embodiment, the Home Agent sends a DHCPRELEASE message to the IP address of the allocating DHCP server. The DHCPRELEASE message may, for example, identify a dynamically assigned home address or care-of address, as well as other fields required by RFC 2131. The appropriate entry in the Home Agent's mobility binding table is deleted at 508.

Figure 6:
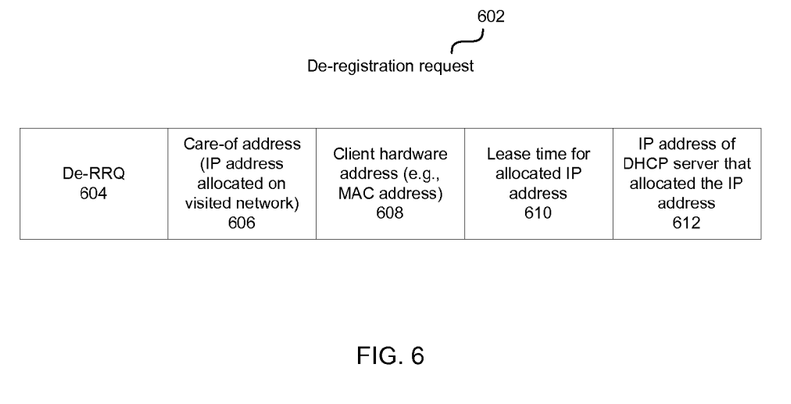
FIG. 6 is a diagram illustrating an exemplary de-registration request in accordance with one embodiment of the invention.

FIG. 6 is a diagram illustrating an exemplary de-registration request 602 in accordance with one embodiment of the invention. The de-registration request 602 may be sent in the form of a standard registration request 604 (e.g., with a lifetime equal to zero), which typically includes fields such as a home address field (not shown) and a care-of address field 606. As described above, the care-of address field 606 may carry the collocated care-of address that has been assigned to the Mobile Node. Generally, the registration request 604 need not include the Mobile Node's hardware address (e.g., MAC address). However, in accordance with one embodiment, in order to enable a release message to be transmitted to the allocating server, the Mobile Node's hardware address 608 may be transmitted in the registration request 304. In addition, the lease time 610 for the allocated care-of address/home address may also be provided in the registration request 604. In order to identify the server that has allocated the IP address, a server address 612 identifying the server (e.g., DHCP server) that allocated the care-of address/home address may also be provided in the registration request 604. For instance, the hardware address 608, lease time 610, and/or server address 612 may be provided in extensions to the registration request 604.

While the Home Agent may contact the server to release an IP address, the Mobile Node may also contact the server to release the IP address after registering with its Home Agent. The registration may be performed via standard registration processes or in accordance with those set forth above. The IP address may be a care-of address or a home address. As set forth above, this may be accomplished via a DHCPRELEASE message.

The above-described embodiments enable IP addresses that have been allocated as collocated care-of addresses or home addresses to be released when no longer in use. It is important to note that this release is prior to the end of the lease time associated with the IP address, which may be much longer than the actual time that the IP address (collocated care-of address or home address) is used by the Mobile Node. As a result, the disclosed embodiments enable the number of IP addresses that are available at any given point in time to be maximized.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the registration and IP address optimization techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 7:
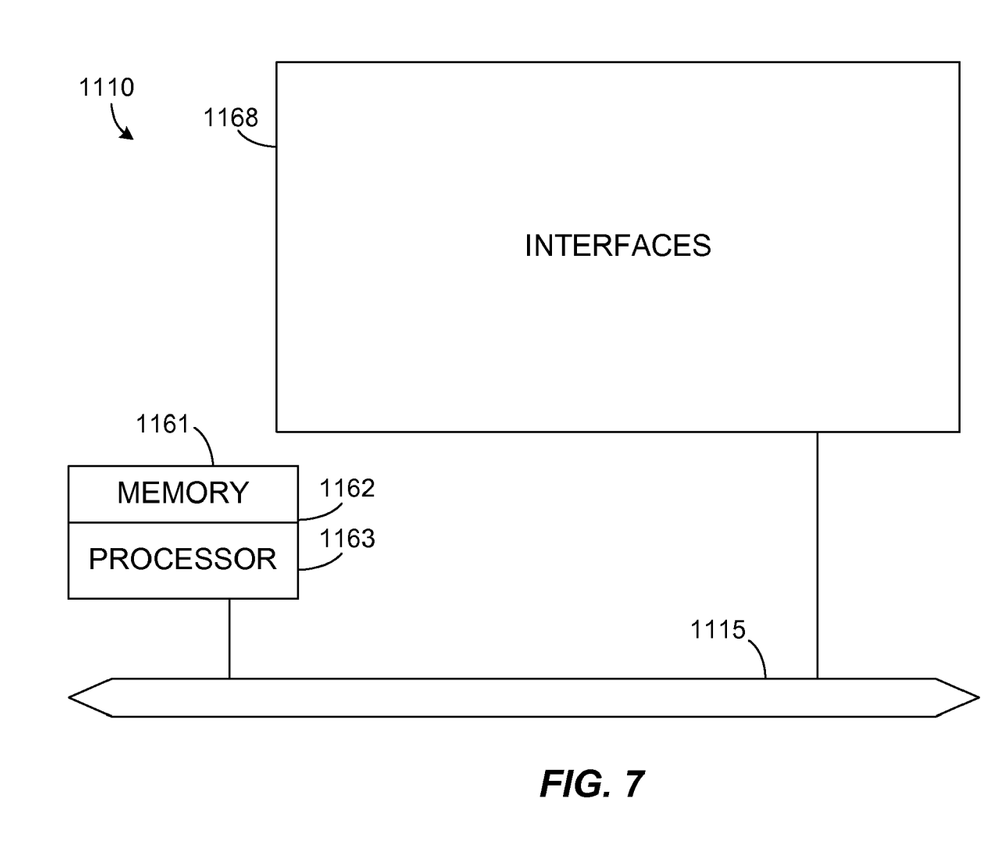
FIG. 7 is a diagrammatic representation of a router in which embodiments of the present invention may be implemented.

Referring now to FIG. 7, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats are merely illustrative, and therefore other messages may be used to initiate and accomplish the release of IP addresses that have been allocated as care-of addresses (or home addresses) when no longer in use. Moreover, although the example described refers primarily to IPv4, the present invention may be used with IP addresses that conform to other versions of IP, such as IPv6. Therefore, the described embodiments should be taken as illustrative and not restrictive, and the invention should not be limited to the details given herein but should be defined by the following claims and their full scope of equivalents.

What is claimed is:

1. In a Mobile Node supporting Mobile IP, a method of registering with a Home Agent, comprising:
    obtaining a collocated care-of address, the collocated care-of address being a local IP address associated with a network to which the Mobile Node has roamed;
    composing a registration request message including the collocated care-of address, a home address associated with the Mobile Node, and an address associated with a server that allocated the local IP address, wherein the server is not the Home Agent, and wherein the server is not the Mobile Node;
    sending the registration request message to a Home Agent, thereby enabling the Home Agent to initiate a release of the local IP address by the server when the local IP address is no longer being used by the Mobile Node, wherein upon release of the local IP address, the local IP address is available for use by other entities; and
    receiving a registration reply from the Home Agent.

2. The method as recited in claim 1, wherein the server is a Dynamic Host Configuration Protocol (DHCP) server.

3. In a Home Agent supporting Mobile IP, a method of registering a Mobile Node with the Home Agent, comprising:
    receiving a registration request from the Mobile Node, the registration request including a home address associated with the Mobile Node and a care-of address, the care-of address being a local IP address associated with a network to which the Mobile Node has roamed, wherein the registration request message further includes an address associated with a server that allocated at least one of the care-of address or the home address;

authenticating the Mobile Node associated with the home address;

storing the care-of address associated with the Mobile Node;

storing the address associated with the server that allocated at least one of the care-of address or the home address in a mobility binding table entry;

sending a registration reply to the Mobile Node; and initiating a release of at least one of the care-of address or the home address when no longer used by the Mobile Node;

wherein initiating a release of at least one of the care-of address or the home address comprises:

obtaining the address associated with the server that allocated at least one of the care-of address or the home address from the mobility binding table entry; and sending an instruction to the address associated with the server to release at least one of the care-of address or the home address identified in the mobility binding table entry.

4. The method as recited in claim 3, wherein the server is a Dynamic Host Configuration Protocol (DHCP) server.

5. The method as recited in claim 3, wherein the registration request further comprises a hardware address associated with the Mobile Node.

6. The method as recited in claim 3, wherein initiating a release is performed prior to expiration of a corresponding lease time.

7. The method as recited in claim 3, wherein initiating a release is performed independent of a corresponding lease time.

8. The method as recited in claim 3, wherein initiating a release of at least one of the care-of address or the home address when no longer used by the Mobile Node comprises:

initiating a release of the home address when no longer used by the Mobile Node, wherein upon release of the home address, the home address is available for use by other entities.

9. In a Home Agent supporting Mobile IP, a method of registering a Mobile Node with the Home Agent, comprising:

receiving a registration request from the Mobile Node, the registration request including a home address associated with the Mobile Node and a care-of address, the care-of address being a local IP address associated with a network to which the Mobile Node has roamed;

authenticating the Mobile Node associated with the home address;

storing the care-of address associated with the Mobile Node;

sending a registration reply to the Mobile Node;

receiving a subsequent registration request, the subsequent registration request including a home address associated with the Mobile Node and a care-of address, the care-of address being a local IP address associated with a network to which the Mobile Node has roamed;

determining whether the local IP address associated with the network to which the Mobile Node has roamed obtained from the subsequent registration request is the same as the local IP address previously stored in association with the Mobile Node;

when the local IP address obtained from the subsequent registration request is different from the previously stored local IP address, initiating a release of the previously stored local IP address; and when the local IP address obtained from the subsequent registration request is not different from the previously stored local IP address, not initiating a release of the previously stored local IP address.

10. The method as recited in claim 9, wherein initiating a release of the previously stored local IP address comprises sending an instruction to a server that previously allocated the previously stored local IP address to release the previously stored local IP address.

11. The method as recited in claim 10, further comprising:

identifying an IP address associated with the server that previously allocated the previously stored local IP address; and sending an instruction to the IP address associated with the server to release the previously stored local IP address.

12. The method as recited in claim 9, wherein initiating a release of the previously stored local IP address comprises sending a Dynamic Host Configuration Protocol (DHCP) RELEASE message to a Dynamic Host Configuration Protocol server that previously allocated the previously stored local IP address.

13. In a Home Agent supporting Mobile IP, a method of registering a Mobile Node with the Home Agent, comprising:

receiving a registration request from the Mobile Node, the registration request including a home address associated with the Mobile Node and a care-of address, the care-of address being a local IP address associated with a network to which the Mobile Node has roamed;

authenticating the Mobile Node associated with the home address;

storing the care-of address associated with the Mobile Node;

sending a registration reply to the Mobile Node;

initiating a release of at least one of the care-of address or the home address when no longer used by the Mobile Node;

receiving a de-registration request, the de-registration request including a home address associated with the Mobile Node and a care-of address, the care-of address being a local IP address associated with a network to which the Mobile Node has roamed; and wherein initiating a release of at least one of the care-of address or the home address comprises sending an instruction to a server that previously allocated at least one of the care of address or the home address identified in the de-registration request to release at least one of the care-of address or the home address identified in the de-registration request.

14. The method as recited in claim 13, wherein initiating a release of at least one of the care-of address or the home address when no longer used by the Mobile Node comprises:

initiating a release of the care-of address when no longer used by the Mobile Node, wherein upon release of the care-of address, the care-of address is available for use by other entities.

15. A Home Agent supporting Mobile IP and configured for registering a Mobile Node with the Home Agent, comprising:

a processor; and a memory, at least one of the processor or the memory being adapted for:

receiving a registration request from the Mobile Node, the registration request including a home address associated with the Mobile Node and a care-of address, the care-of address being a local IP address associated with a network to which the Mobile Node has roamed, wherein the registration request message further includes an address associated with a server that allocated at least one of the care-of address or the home address;

authenticating the Mobile Node associated with the home address;

storing the care-of address associated with the Mobile Node;

storing the address associated with the server that allocated at least one of the care-of address or the home address in a mobility binding table entry;

sending a registration reply to the Mobile Node; and initiating a release of at least one of the care-of address or the home address when no longer used by the Mobile Node;

wherein initiating a release of at least one of the care-of address or the home address comprises:

obtaining the address associated with the server that allocated at least one of the care-of address or the home address from the mobility binding table entry; and sending an instruction to the address associated with the server to release at least one of the care-of address or the home address identified in the mobility binding table entry.

16. The Home Agent as recited in claim 15, wherein the server is a Dynamic Host Configuration Protocol (DHCP) server.

17. A Home Agent supporting Mobile IP and adapted for registering a Mobile Node with the Home Agent, comprising:

a processor; and a memory, at least one of the processor or the memory being adapted for:

receiving a registration request from the Mobile Node, the registration request including a home address associated with the Mobile Node and a care-of address, the care-of address being a local IP address associated with a network to which the Mobile Node has roamed;

authenticating the Mobile Node associated with the home address;

storing the care-of address associated with the Mobile Node;

sending a registration reply to the Mobile Node;

receiving a subsequent registration request, the subsequent registration request including a home address associated with the Mobile Node and a care-of address, the care-of address being a local IP address associated with a network to which the Mobile Node has roamed;

determining whether the local IP address associated with the network to which the Mobile Node has roamed obtained from the subsequent registration request is the same as the local IP address previously stored in association with the Mobile Node;

when the local IP address obtained from the subsequent registration request is different from the previously stored local IP address, initiating a release of the previously stored local IP address; and when the local IP address obtained from the subsequent registration request is not different from the previously stored local IP address, not initiating a release of the previously stored local IP address.

18. The Home Agent as recited in claim 17, wherein initiating a release of the previously stored local IP address comprises sending an instruction to a server that previously allocated the previously stored local IP address to release the previously stored local IP address.

19. The Home Agent as recited in claim 18, at least one of the processor or the memory being further adapted for:

identifying an IP address associated with the server that previously allocated the previously stored local IP address; and sending an instruction to the IP address associated with the server to release the previously stored local IP address.

20. A Home Agent supporting Mobile IP and adapted for registering a Mobile Node with the Home Agent, comprising:

a processor; and a memory, at least one of the processor or the memory being adapted for:

receiving a registration request from the Mobile Node, the registration request including a home address associated with the Mobile Node and a care-of address, the care-of address being a local IP address associated with a network to which the Mobile Node has roamed;

authenticating the Mobile Node associated with the home address;

storing the care-of address associated with the Mobile Node;

sending a registration reply to the Mobile Node;

initiating a release of at least one of the care-of address or the home address when no longer used by the Mobile Node;

receiving a de-registration request, the de-registration request including a home address associated with the Mobile Node and a care-of address, the care-of address being a local IP address associated with a network to which the Mobile Node has roamed; and wherein initiating a release of at least one of the care-of address or the home address comprises sending an instruction to a server that previously allocated at least one of the care of address or the home address identified in the de-registration request to release at least one of the care-of address or the home address identified in the de-registration request.

21. The Home Agent as recited in claim 20, wherein the server is a Dynamic Host Configuration Protocol (DHCP) server.

22. In a Home Agent supporting Mobile IP, a method of registering a Mobile Node with the Home Agent, comprising:

receiving a registration request from the Mobile Node, the registration request including a home address associated with the Mobile Node and a care-of address, the care-of address being a local IP address associated with a network to which the Mobile Node has roamed;

authenticating the Mobile Node associated with the home address;

storing the care-of address associated with the Mobile Node;

sending a registration reply to the Mobile Node; and initiating a release of the care-of address when no longer used by the Mobile Node, wherein upon release of the care-of address, the care-of address is available for use by other entities, wherein initiating a release of at the care-of address comprises sending an instruction to a server that previously allocated the care of address identified in the de-registration request to release the care-of address.

23. The method as recited in claim 22, wherein storing care-of address associated with the Mobile Node comprises updating a mobility binding table entry to include the local IP address.

24. The method as recited in claim 22, further comprising storing an address associated with the server that previously allocated the care-of address in a mobility binding table entry.

25. The method as recited in claim 22, wherein the registration request message further includes an address associated with the server that previously allocated the care-of address.

26. In a Home Agent supporting Mobile IP, a method of registering a Mobile Node with the Home Agent, comprising:

receiving a registration request from the Mobile Node, the registration request including a home address associated with the Mobile Node and a care-of address, the care-of address being a local IP address associated with a network to which the Mobile Node has roamed;

authenticating the Mobile Node associated with the home address;

storing the care-of address associated with the Mobile Node;

sending a registration reply to the Mobile Node; and initiating a release of the care-of address when no longer used by the Mobile Node, wherein upon release of the care-of address, the care-of address is available for use by other entities,     receiving a de-registration request, the de-registration request including the home address associated with the Mobile Node and the care-of address; and     wherein initiating a release of the care-of address is performed in response to receiving the de-registration request.

27. In a Mobile Node supporting Mobile IP, a method of registering with a Home Agent, comprising:

obtaining a collocated care-of address, the collocated care-of address being a local IP address associated with a network to which the Mobile Node has roamed;

composing a registration request message including the collocated care-of address, a home address associated with the Mobile Node, and an address associated with a server that allocated the local IP address, wherein the server is not the Home Agent;

sending the registration request message to a Home Agent, thereby enabling the Home Agent to initiate a release of the local IP address by the server when the local IP address is no longer being used by the Mobile Node, wherein upon release of the local IP address, the local IP address is available for use by other entities;

receiving a registration reply from the Home Agent; and sending an instruction to the Home Agent to initiate a release of the care-of address when no longer used by the Mobile Node, wherein upon release of the care-of address, the care-of address is available for use by other entities.

\* \* \* \* \*